United States Patent [19]

LeGrand

[11] 4,087,755
[45] May 2, 1978

[54] SOLID STATE PULSE GENERATOR FOR AN AIR NAVIGATIONAL SYSTEM

[75] Inventor: Jesse S. LeGrand, Clifton, N.J.

[73] Assignee: International Telephone & Telegraph Corporation, Nutley, N.J.

[21] Appl. No.: 618,710

[22] Filed: Oct. 1, 1975

[51] Int. Cl.² .............................................. H03K 7/00
[52] U.S. Cl. .................................... 325/151; 325/164; 325/186
[58] Field of Search .............. 343/101, 102, 106, 17.1; 325/105, 141, 142, 143, 161, 164, 169, 150, 151, 185, 186; 328/34, 59, 53, 54, 58, 258, 259; 307/260, 264, 265, 106; 323/9, 17, 63, 64, 66

[56] References Cited

U.S. PATENT DOCUMENTS

| | | | |
|---|---|---|---|
| 2,708,738 | 5/1955 | Hathaway | 325/185 X |
| 3,667,049 | 5/1972 | Ostroff et al. | 325/164 |

Primary Examiner—Benedict V. Safourek
Attorney, Agent, or Firm—John T. O'Halloran; Peter C. Van Der Sluys

[57] ABSTRACT

Solid state apparatus for transmitting signals in an air communication, navigational or identification system wherein a signal generator produces pulses of a desired character and repetition rate. In a normal mode of operation, Gaussian-shape pulses are formed by subjecting a linear phase or Gaussian filter to impulse signals. A responsive amplifier produces pulse signals for driving an RF transmitter which broadcasts air communication, navigational or identification signals. The signal generator and amplifier receive operating voltages from a power supply having an output characteristic such that the amplitude of the signal generator and amplifier output signals are reduced relative to increased pulse repetition rate in order to prevent overdriving the transmitter and to maintain optimum system efficiency.

10 Claims, 3 Drawing Figures

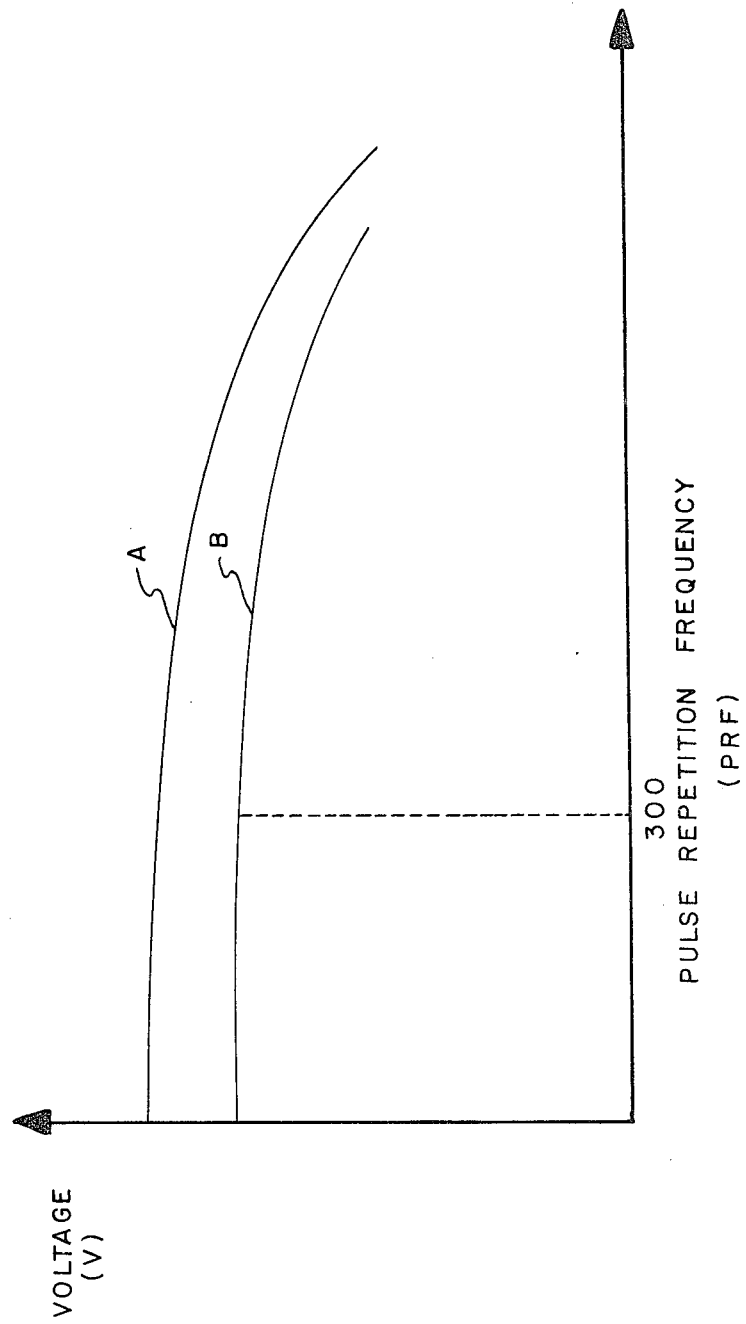

4,087,755

SOLID STATE PULSE GENERATOR FOR AN AIR NAVIGATIONAL SYSTEM

BACKGROUND OF THE INVENTION

The present invention generally relates to radio air navigational systems and more particularly to the generation of pulse-type signals used for the transmission of range and bearing information. The invention is capable of use in a wide range of other applications but is primarily intended for the above purpose and is therefore described in that context.

Radio air navigational systems of the "TACAN/DME" type employ pulse generating and transmitting equipment in providing range and bearing information to airplanes. A system of this type is described in "Principles and Features of Tacan (Tactical Air Navigational System)," published by Federal Telephone and Radio Company in 1956. A transmitter is associated with a special directional antenna broadcasts radio frequency pulses which upon receipt by appropriate equipment provide bearing information to airplanes within a defined geographical area. Additionally, there is a receiver-transmitter combination (transponder) which provides range information when interrogated by pulses transmitted from airborne equipment. In most instances, the bearing pulse transmitter and transponder are ground based while the bearing receiver and range pulse transmitter are airborne. However, as obvious the ground based equipment may be airborne, thereby providing range and bearing information to an aircraft or more properly speaking, between aircraft.

From the brief description presented and as provided in more detail by the referenced publication, systems of this type depend upon the generation and formation of pulses of particular character and repetition rate to send and receive air navigational information. Prior art systems have used vacuum tube electronic equipment of conventional design in the production of these pulsed signals. Of course, the concomitant size, power requirements and reliability factors of vacuum tube systems have created a need for the development of solid state equipment capable of meeting system requirements in an improved manner.

In furtherance of this, systems have been developed for airborne navigational equipment using triggered devices such as SCR's, Shockley diodes and other similar components. Since the pulse forming networks must operate at considerably high power levels, the pulse shaping and forming circuits have been significantly dependent upon the load impedance and power supply voltages. Additionally, since the recovery time of available triggered devices is relatively long, it is necessary to employ a separate device for each pulse when sending out bursts of pulses necessary in airborne systems of current design. Moreover, systems of this type may be susceptible to severe reliability problems unless design caution in circuit redundancy, etc. is used. The transistorized pulse generator of the present invention overcomes these difficulties providing equipment wherein pulse generation and shaping is accomplished at low power levels relatively unaffected by load impedance variations. As a result, a more nearly ideal frequency spectrum for the transmitted pulses is achieved in addition to a system having enhanced reliability and size economy.

Therefore, it is an object of the present invention to provide an improved apparatus for transmitting pulse signals in an air navigational system.

Another object of the present invention is to provide apparatus for transmitting air navigational pulses having smaller physical size and enhanced reliability.

Yet another object of the present invention is to provide an air navigational pulse transmitter relatively unaffected by variances in load impedance and power supply voltage.

Still another object of the present invention is to provide an air navigational pulse transmitter substantially unaffected by increases in in pulse repetition rate.

SUMMARY OF THE INVENTION

In accomplishing the above objectives and obviating the difficulties with which the prior art is plagued, the present invention contemplates improved apparatus for transmitting pulse signals in an air navigational system. The system employs a signal generator which provides pulses of a desired character and repetition rate. A pulse amplifier in response to these generated signals produces driving pulses for an RF transmitter which ultimately broadcasts to either airborne or ground facilities through an appropriate antenna. The operating voltages for the signal generator and pulse amplifier are provided by a power supply having an output characteristic of selected design, such that the signal generator and pulse amplifier outputs are modified relative to the repetition rate to prevent overdriving of the transmitter and to maintain optimum equipment efficiency.

In a normal mode of operation, impulse functions of selected repetition rate are supplied to a linear phase or Gaussian filter producing Gaussian-shape pulses. After being amplified through appropriate preamplifier and power amplifier stages, these Gaussian pulses are used to modulate the transmitter in sending out the air navigational signals. As the repetition rate is increased, a drooping output voltage characteristic of the power supply proportionately decreases the operating voltages of the Gaussian pulse forming means and the power amplifier thus preventing any overdriving of the transmitter as well as maintaining optimum efficiency of the power amplifier. The latter is extremely important in the design of airborne equipment and particularly solid state airborne equipment operating at relatively high power levels.

For a better understanding of the present invention together with other and further objects thereof, reference is had to the following description taken in connection with the accompanying drawings while the scope of the present invention is pointed out in the appended claims.

BRIEF DESCRIPTION OF THE DRAWINGS

FIG. 3 is a graph demonstrating the output characteristic of the power supply of FIG. 1.

The drawings are intended as illustrative of the present invention and in no way delimiting of its scope. Conventional symbols are used and the same numbers identify similar parts in the various figures.

DESCRIPTION OF THE PREFERRED EMBODIMENTS

Figure 1:
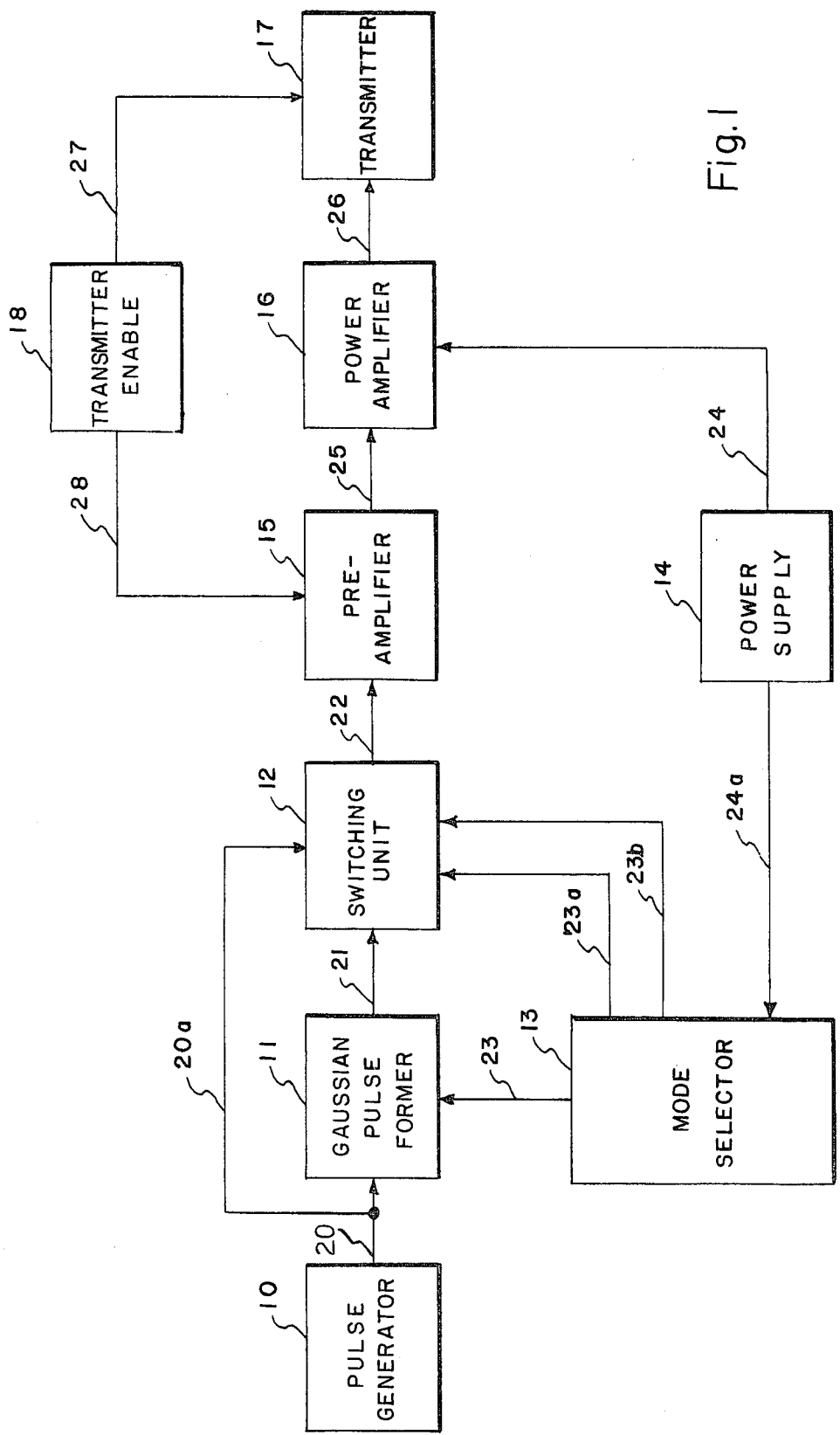
FIG. 1 is a block diagram of a portion of an air navigational system employing the present invention.

Referring to FIG. 1, there is shown a portion of a radio air navigation system generating pulse signals for the modulation of a radio frequency carrier. This embodiment is capable of operation in three modes. A "Normal" mode wherein transmitter driving pulses are essentially Gaussian in shape with a half amplitude width of 3.5 microseconds, produced as single pulses or in pairs or triplets with spacings of 10 or more microseconds. A "Burst" mode, wherein bursts of the same Gaussian-shape pulses, for example 10 pulses within a 30 microsecond spacing, are generated finding application principally, although not exclusively, in air-to-air navigational systems for transmitting bearing information. In a "Sharp" mode, pulses with fast rise and fall times of fractions of microsecond are generated and in this mode, the equipment associated with forming Gaussian waveforms is by-passed.

Directing our attention specifically to the system block diagram, a pulse generator 10 is used to supply desired impulse or pulse signals at rates and rise times commensurate with either the "Normal", "Burst" or "Sharp" modes. When operating in the "Normal" or "Burst" modes, pulse generator 10 sends impulse signals over line 20 to a Gaussian pulse former 11. Gaussian pulse former 11 contains both amplifier and waveform shaping circuitry necessary to produce a Gaussian-shape pulse signal of a predetermined amplitude and width.

Pulse generator 10 and Gaussian pulse former 11 form that portion of a system associated with the generation of signal pulses having a desired character and repetition rate. The generated pulses are conducted over line 21 to a switching unit 12. Switching unit 12 is controlled by mode selector 13 through channels 23a and 23b. Mode selector 13 determines the character of the utilization signal to be employed in the remainder of the system. Depending on the logic of the system, signals conducted over channels 23a and 23b establish whether "Normal" Gaussian or "Burst" Gaussian pulses are to be provided by the signal generator equipment. In addition, by the appropriate selection of signals on the same lines 23a and 23b, Gaussian pulse former 11 may be by-passed in which instance "Sharp" pulses, i.e. having desired rise time, are conducted over line 20a from pulse generator 10.

Switching unit 12 controlled to a desired mode selection transmits a pulse of desired character and repetition rate to a preamplifier 15 which is serially connected through line 25 to power amplifier 16. Preamplifier 15 and power amplifier 16 form the pulse amplifier portion of the equipment responsive to the pulses provided by the signal generator. Transmitter 17 is in turn driven by the output pulses of power amplifier 16 conducted through line 26. In transmitter 17, a suitable RF carrier is modulated in a predetermined manner by the driving pulses derived from the pulse amplifier.

In order to avoid damage to transmitter 17 by applying driving pulses prior to its being in a ready state, a transmitter enable 18 provides enabling signals to transmitter 17 and preamplifier 15 over lines 27 and 28, respectively. Failure to provide an enabling signal prevents both operation of transmitter 17 as well as the presence of driving pulses over line 26.

A separate system power supply 14, in addition to the normal operating voltages supplied by conventional power supplies, provides special operating voltages to power amplifier 16 over line 24, and to Gaussian pulse former 11 through line 24a, mode selector 13 and line 23. The operating voltage of Gaussian pulse former 11 is brought through mode selector 13 so that its amplitude will be automatically varied when the system is operating in the "Normal" mode as a function of the average pulse repetition rate. In addition, the voltage is set at a lower level when operating in the "Burst" mode.

Figure 2:
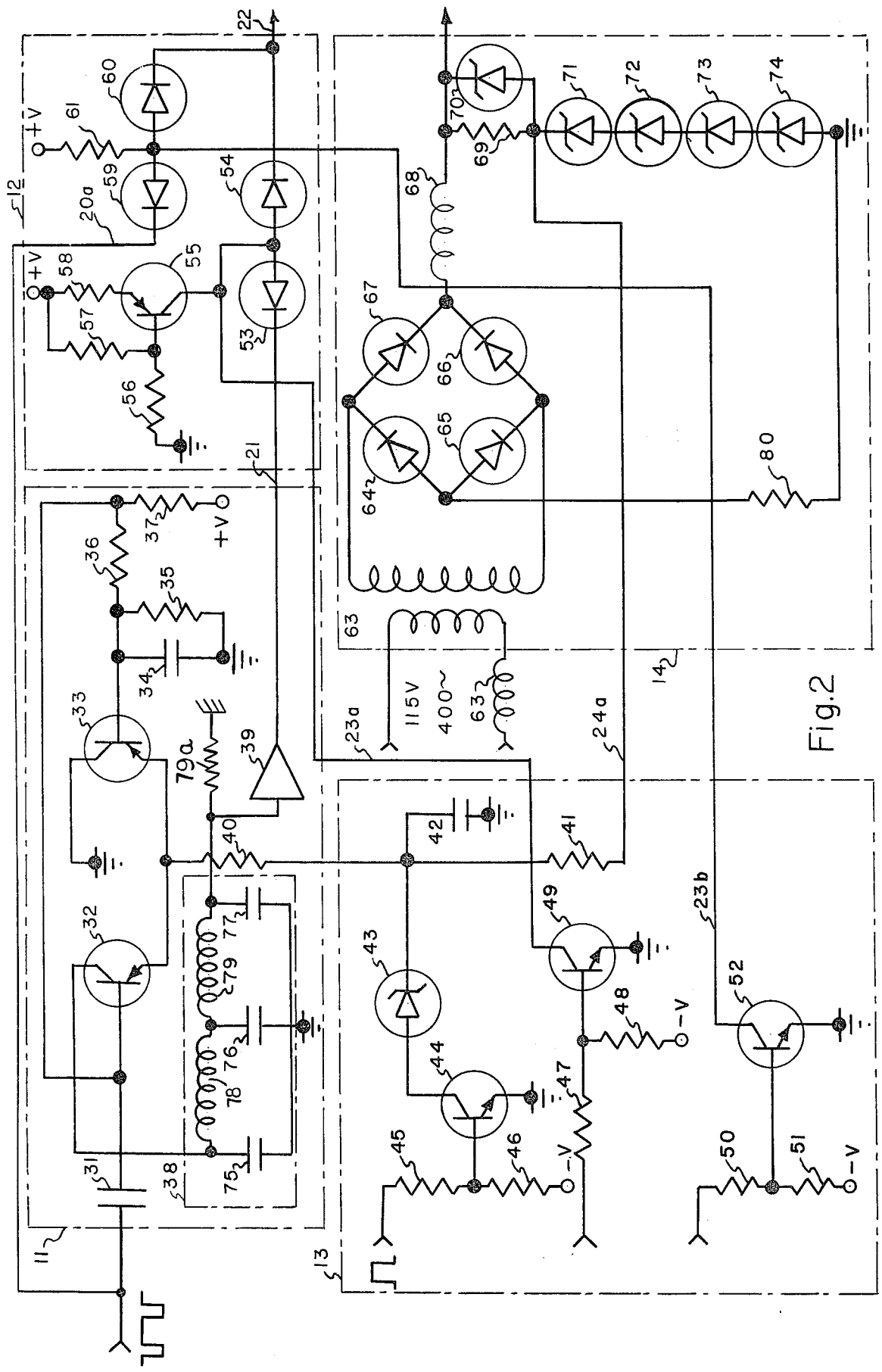
FIG. 2 is a functional schematic of portions of the system depicted in FIG. 1.

To provide a broader understanding of both the structure and operation of the present invention, reference is had to FIG. 2 which displays in greater detail the circuitry and equipment arrangement of Gaussian pulse former 11, switching unit 12, mode selector 13 and power supply 14. This equipment is described in the various operating modes in order to clarify the purpose and intended function of each component part. In "Normal" mode operation, the logic of the circuitry is selected so that a digital zero enable signal is applied to the base of transistor 49 through series resistor 47 maintaining transistor 49 in an "off" state. Transistor 55 and its associated circuitry, emitter-resistor 58 and base resistors 56 and 57, supply a constant current to the junction of diodes 53 and 54 thereby establishing a low impedance path between operational amplifier 39 and the input to preamplifier 15 over line 22. When in this mode a digital 1 signal is applied to the base of transistor 52 through series resistor 50, thus keeping transistor 52 in saturation and diodes 59 and 60 effectively an open circuit. This latter state prevents the transmission of any "Sharp" pulses over line 22 to preamplifier 15. The "Burst enable" signal equals zero thereby keeping transistor 44 in an "off" position by the imposition of the enable signal on its base through series resistor 45. In this condition, no current may flow through Zener diode 43 and the voltage, as determined by associated circuitry parameters, on the junction of transistors 32 and 33 remains unchanged.

In a quiescent condition, the emitter current of transistor 33 of Gaussian pulse former 11 is proportional to the voltage appearing at the junction of Zener diodes 70 and 71 of power supply 14 as determined by series resistors 40 and 41, while transistor 32 is held in an "off" state. As an impulse signal is transmitted to the base of transistor 32 through line 20 and capacitor 31, transistor 33 turns off and transistor 32 turns on. The collector current of transistor 32 is a pulse whose amplitude is proportional to the voltage at the junction of Zener diode 70 and Zener diode 71, and the width is proportional to the predetermined constant 0.485 microsecond width of the normal impulse signal. The collector current of transistor 32 impulses a linear phase or Gaussian filter 38 comprising capacitors 75, 76 and 77, inductors 78 and 79, and resistor 79a, the output of which forms a Gaussian-shape pulse of 3.5 microseconds half amplitude width and amplitude of approximately 0.15 volt for pulse repetition rates of 300 or less per second. The amplitude of this Gaussian pulse is proportional to the decreasing voltage appearing at the junction of Zener diodes 70 and 71 for pulse repetition rates in excess of 300.

Linear operational amplifier 39 has a gain factor of approximately 100 and provides a driving signal for preamplifier 15. The output of preamplifier 15 is at a level of approximately 15 volts capable of supplying several amperes. Assuming transmitter enable unit 18 is sending an enabling signal to preamplifier 15, output pulses will be fed into power amplifier 16 through line 25. Thus, transmitter enable 18 provides a safety function preventing the generation of driving pulses unless it is in an enabling mode.

Power amplifier 16 is basically an amplifier of conventional design well known to those of ordinary skill in the art. The utilization of a large amount of negative feedback results in class B linear operation and virtually eliminates adverse temperature effects. Through the selection of appropriate output load impedances, the total collector-to-ground swing at a pulse repetition rate of 300 of the output stage is approximately 300 volts and since the power supply 14 voltage is slightly greater than 300 volts, the amplifier is operating at optimum efficiency. Power amplifier 16 utilizes six parallel transistors in its final stage capable of providing 40 amperes.

As the pulse repetition rate of pulse generator 10 is increased, power supply 14 is designed to have a descending or drooping output characteristic. Power supply 14 is of substantially conventional design in which the output of a transformer 63 is full wave rectified by diodes 64, 65, 66 and 67 with choke output characteristics provided by series inductance 68. Arrayed across the output of the full wave bridge is parallel combination of resistor 69 and Zener diode 70 in series with Zener diodes 71 through 74. An inductance 62 is placed in series with the primary winding of transformer 63 providing for increased voltage drop without power loss as the load demand on power supply 14 output is increased.

FIG. 3 shows in qualitative form the drooping output characteristic of power supply 14 regulated to maintain a substantially constant output at the junction of Zener diodes 70 and 71 up to a repetition rate of 300 and deceasing thereafter. Regulation is achieved by the action of Zener diodes 70 through 74. Choke output characteristics of power supply 14 are maintained by the current drawn through resistor 69 and Zener diodes 70 through 74. At higher pulse repetition rates where the output characteristic drops below the regulated voltage level, the Zener diodes do not draw current.

As the pulse repetition rate increases above approximately 300, power supply 14 voltage represented by Curve A of FIG. 3 and transistor 32 operating voltage represented by Curve B decrease simultaneously and proportionately thereby maintaining the optimum efficiency heretofore mentioned as well as preventing overdriving of transmitter 17. The design is such that at a pulse repetition rate of approximately 1050, power amplifier 16 and transistor 32 operating voltages are approximately 70 per cent of their respective values at a pulse repetition rate of 300. Obviously, as the pulse repetition rate goes below 300, power amplifier 16 operating voltage increases above Gaussian pulse former 11 operating voltage determined by the regulation provided by Zener diodes 71 through 74.

The following is a listing of typical component values utilized in the design of Gaussian pulse former 11, switching unit 12, mode selector 13 and power supply 14 in order to achieve the desired range of operating parameters:

| COMPONENT | VALUE |
|---|---|
| Transistors | |
| 32 and 33 | 2N2605 |
| 44 | 2N760A |
| 49 | 2N3302 |
| 52 | 2N3302 |
| Capacitors | |
| 31 | .01 microfarad |
| 34 | .01 microfarad |
| 75 | 3600 1% picofarad |
| 76 | 1800 1% picofarad |
| 77 | 390 1% picofarad |
| 42 | .001 microfarad |
| Inductances | |
| 78 | 1.1 mhy |
| 79 | 0.510 mhy |
| Resistors | Ohms |
| 37 | 18 k |
| 36 | 910 |
| 35 | 2.7 k |
| 40 | 22.1 k |
| 41 | 100 k |
| 45 | 1 k |
| 46 | 6.8 k |
| 47 | 1 k |
| 48 | 6.8 k |
| 50 | 1 k |
| 51 | 6.8 k |
| 57 | 3.3 k |
| 56 | 22 k |
| 58 | 1.2 k |
| 61 | 4.7 k |
| 69 | 12 k |
| 80 | 47 ohm 2 watt |
| 79a | 665 |
| Zener Diodes | |
| 43 | 1N971B |
| 70 through 74 | 1N3040B |
| Operational Amplifier | |
| 39 | UA 709 |
| Diodes | |
| 64 through 67 | 1N3957 |
| 53, 54, 59 and 60 | 1N4148 |
| Transformers | |
| 63 | FT4242 |

When operating in the "Burst" mode, transistor 44 is placed in a saturated state by the presence of an enabling 1 signal on its base. This causes the voltage appearing at the junction of resistors 40 and 41 to remain at a constant level determined by Zener diode 43. This further results in a constant current into transistors 32 and 33 and an output pulse amplitude independent of pulse repetition rate for all rates within the design range of the pulse generator system. Although power supply 14 voltage will initially sag with a burst of pulses, such as 10 pulses within a 30 microsecond period, the latter pulses of the group are not affected and remain entirely similar to that described in the "Normal" mode and no further explanation need be provided.

In the sharp pulse mode of operation, the imposition of an enabling zero signal on the base of transistor 52 and a disabling signal on the base of transistor 49, permits the transmission of sharp rise and fall time pulses on line 20e through diodes 59 and 60 into preamplifier 15 through line 22.

Thus, there has been described a transistor pulse modulator primarily intended for use in radio tactical air navigational equipment. Briefly, the apparatus for transmitting navigational signals comprises a signal generator formed by pulse generator 10, Gaussian pulse former 11 and switching unit 12 providing pulses of desired character and repetition rate. A pulse amplifier made up of preamplifier 15 and power amplifier 16 is responsive to these pulses and produces a series of driving pulses for the modulation of an RF transmitter and which sends or broadcasts the navigational signals. A special power supply 14 is provided which controls operating voltages to the signal generator and pulse amplifier so that the signal generator output pulses and driving pulses are modified relative to the repetition rate to prevent overdriving the transmitter and to maintain an optimum operating efficiency. The complete solid state design of the equipment enables a decrease in equipment size while achieving increased reliability.

In describing exemplary structural and operational features of the present invention, it is intended that all those modifications which are obvious to one of ordinary skill in the art come within the scope of the invention as described in the appended claims.

I claim:

1. Apparatus for transmitting signals in an air navigational system comprising:
   a signal generator providing pulses of desired character and repetition rate;
   a pulse amplifier responsive to said pulses for producing driving pulses;
   a radio frequency transmitter responsive to said driving pulses modulating a carrier for sending said signals; and
   a power supply providing operating voltages to said signal generator and said pulse amplifier, said power supply having an output characteristic such that said pulses and said driving pulses are modified relative to said repetition rate to prevent overdriving said transmitter and to maintain optimum pulse amplifier efficiency.

2. The apparatus of claim 1, wherein said signal generator normally provides Gaussian-shape pulses having a desired spectrum content and said signal generator, pulse amplifier and power supply are of solid state design.

3. The apparatus of claim 2, wherein said Gaussian shape is produced by impulsing a linear phase filter and said power supply output characteristic decreases with increases in said repetition rate and said pulses' and said driving pulses' amplitudes are decreased proportionately to said power supply output characteristic.

4. Apparatus for transmitting signals in an air navigational system comprising:
   a signal generator providing pulses of desired character and repetition rate;
   means for selecting said desired pulse character and repetition rate;
   a pulse amplifier responsive to said pulses for producing driving pulses;
   a radio frequency transmitter responsive to said driving pulses modulating a carrier for sending said signals; and
   a power supply providing operating voltages to said signal generator and said pulse amplifier, said power supply having an output characteristic such that said pulses and said driving pulses are modified relative to said repetition rate to prevent overdriving said transmitter and to maintain optimum pulse amplifier efficiency.

5. The apparatus of claim 4, wherein said pulse amplifier is controlled to produce said driving pulses by enabling means.

6. The apparatus of claim 5, wherein said pulse amplifier includes a preamplifier and a power amplifier for driving said transmitter, and said preamplifier only produces output pulses when enabled by said enabling means.

7. The apparatus of claim 6, wheren said power supply provides operating voltage to Gaussian pulse former means of said signal generator, and said operating voltage is regulated to provide a substantially constant level up to a pulse repetition rate of approximately 300 pulses per second and a decreasing level thereafter; and said operating voltage to said pulse amplifier provides a voltage level to said power amplifier which decreases with increasing said repetition rate, said both operating voltages decreasing in substantially the same proportion.

8. The apparatus of claim 7, wherein said power supply comprises a choke characteristic full wave rectifier having a transformer input, said transformer having a series inductor in its primary thereby causing said output characteristic to decrease with increasing said repetition rate.

9. The apparatus of claim 8, wherein said regulation is provided by Zener diodes arrayed across said full wave rectifier output, and wherein said Gaussian pulse former means operating voltage is decreased to a second lower level when said repetition rate is increased above a certain predetermined value.

10. The apparatus of claim 9, wherein said decreased operating voltage level is controlled by mode selection means in said generator, and wherein said predetermined pulse repetition rate is commensurate with pulses having 30 microsecond spacing.

* * * * *